(12) United States Patent
Kohara et al.

(10) Patent No.: US 8,866,356 B2
(45) Date of Patent: Oct. 21, 2014

(54) MOTOR

(75) Inventors: Yuki Kohara, Chiyoda-ku (JP);
Kazuyuki Enomoto, Chiyoda-ku (JP);
Qiangsong Shao, Chiyoda-ku (JP);
Kazuaki Ando, Chiyoda-ku (JP); Akira Tanabe, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 13/505,186

(22) PCT Filed: Sep. 30, 2011

(86) PCT No.: PCT/JP2011/072558
§ 371 (c)(1),
(2), (4) Date: Apr. 30, 2012

(87) PCT Pub. No.: WO2013/046433
PCT Pub. Date: Apr. 4, 2013

(65) Prior Publication Data
US 2013/0082551 A1 Apr. 4, 2013

(51) Int. Cl.
*H02K 5/22* (2006.01)
*H02K 11/00* (2006.01)

(52) U.S. Cl.
CPC ............ *H02K 5/225* (2013.01); *H02K 11/0073* (2013.01)
USPC .......................................... 310/71; 310/68 B

(58) Field of Classification Search
USPC .................................................. 310/71, 68 R
See application file for complete search history.

(56) References Cited

U.S. PATENT DOCUMENTS

| 5,996,209 | A | * | 12/1999 | Molnar et al. .................. 29/596 |
| 6,020,660 | A | * | 2/2000 | Wright ........................ 310/68 R |
| 6,028,386 | A | * | 2/2000 | Kech et al. ..................... 310/194 |
| 6,081,056 | A | * | 6/2000 | Takagi et al. .................... 310/89 |
| 6,707,185 | B2 | * | 3/2004 | Akutsu et al. .................... 310/71 |
| 2007/0153448 | A1 | | 7/2007 | Okumura et al. |

FOREIGN PATENT DOCUMENTS

| DE | 197 44 422 A1 | 4/1998 | |
| JP | 10-234158 A | 9/1998 | |
| JP | 10-257720 A | 9/1998 | |
| JP | 10257720 A | * 9/1998 | ............ H02K 11/00 |

(Continued)

OTHER PUBLICATIONS

Korean Office Action, issued May 29, 2013, Patent Application No. 10-2012-7012738.

(Continued)

*Primary Examiner* — Quyen Leung
*Assistant Examiner* — Naishadh Desai
(74) *Attorney, Agent, or Firm* — Sughrue Mion, PLLC

(57) ABSTRACT

A motor includes a motor section and an amplifier section. The motor section and the amplifier section are electrically and mechanically connected with each other via a wire connection base using a screw. A pitch diameter for a plurality of electrical connection parts of the wire connection base with the motor section disposed on a circumference whose center is at a shaft center of the rotating shaft is set to be smaller than a pitch diameter for a plurality of electrical and mechanical connection parts with the amplifier section. The amplifier section includes a plurality of circuit substrates disposed in a layered form in a direction perpendicular to the rotating shaft, and the plurality of circuit substrates are electrically and mechanically screw-fastened to the plurality of electrical and mechanical connection parts of the wire connection base with the amplifier section via a conductive spacer.

7 Claims, 6 Drawing Sheets

(56) References Cited

FOREIGN PATENT DOCUMENTS

| | | |
|---|---|---|
| JP | 11-356006 A | 12/1999 |
| JP | 2000023408 A | 1/2000 |
| JP | 2007174746 A | 7/2007 |
| JP | 2010-028925 A | 2/2010 |
| JP | 2010-041856 A | 2/2010 |

OTHER PUBLICATIONS

German Office Action, issued Jul. 22, 2014, for corresponding German patent application.

* cited by examiner

MOTOR

CROSS REFERENCE TO RELATED APPLICATIONS

This application is a National Stage of International Application No. PCT/JP2011/072558 filed on Sep. 30, 2011, the contents of all of which are incorporated herein by reference in their entirety.

Field

The present invention relates to an amplifier-integrated motor.

BACKGROUND

Although it is mainstream in a conventional technique to place separately a motor and an amplifier for supplying a driving power to the motor, the separate placement type requires a control panel for accommodating the amplifier. In addition, since wiring to connect the motor and the amplifier is required, an amplifier-integrated motor is more advantageous.

In the amplifier-integrated motor, it has been difficult to simultaneously achieve a reduction in the size of an entire motor by a reduction in the volume of an amplifier section to be attached to the motor and a simple assembly structure. Moreover, the amplifier section is formed by a large number of element parts and therefore has a higher failure rate as compared to a motor section. Thus, the amplifier section is desired to have a structure with which the element parts thereof are replaceable.

As a conventional technique, there is disclosed a motor accommodating motor constituent elements in a motor case in which: at least a motor driving circuit substrate and a switching element are accommodated in a module case that forms a part of the motor case to achieve integral formation as a drive circuit module; and the drive circuit module is resin-encapsulated (see Patent Literature 1, for example).

CITATION LIST

Patent Literature

Patent Literature 1: Japanese Patent Application Laid-Open No. Hei. 11-356006

SUMMARY

Technical Problem

According to the conventional technique disclosed in the above-described Patent Literature 1, however, since a circuit substrate and the like (amplifier section) are integrally formed as the drive circuit module and resin-encapsulated, there is a problem that the amplifier section cannot be disassembled and element parts thereof cannot be therefore repaired or replaced when they have a failure. Furthermore, there is a problem that the failure rate of the element parts is increased due to heat stress during the resin encapsulation.

The present invention has been made in view of the above, and an object thereof is to obtain an amplifier-integrated motor that ensures assembly easiness when connecting a motor section and an amplifier section; improves the reliability thereof; simplifies the structure thereof; ensures the maintenance performance of element parts in the amplifier section; and avoids heat stress during the fabrication thereof.

Solution to Problem

In order to solve the above problem and in order to attain the above object, a motor of the present invention, includes: a motor section having a stator around which a coil is wound, and a rotor disposed within the stator for rotary-driving a rotating shaft; and an amplifier section made integral with the motor section for supplying a driving power to the motor section, wherein the motor section and the amplifier section are electrically and mechanically connected with each other via a wire connection base using a screw, a pitch diameter for a plurality of electrical connection parts of the wire connection base with the motor section disposed on a circumference whose center is at a shaft center of the rotating shaft is set to be smaller than a pitch diameter for a plurality of electrical and mechanical connection parts with the amplifier section, and the amplifier section includes a plurality of circuit substrates disposed in a layered form in a direction perpendicular to the rotating shaft, and the plurality of circuit substrates are electrically and mechanically screw-fastened to the plurality of electrical and mechanical connection parts of the wire connection base with the amplifier section via a conductive spacer.

Advantageous Effects of Invention

The motor of the present invention has advantageous effects such that assembly easiness when connecting the motor section and the amplifier section is ensured; the reliability thereof is improved; the structure thereof is simplified; the maintenance performance of the element parts in the amplifier section is ensured; and heat stress during the fabrication thereof can be avoided.

DESCRIPTION OF EMBODIMENTS

Embodiments of a motor according to the present invention will be described below in detail with reference to the drawings. Note that the present invention is not limited by these embodiments.

First Embodiment

Figure 1:
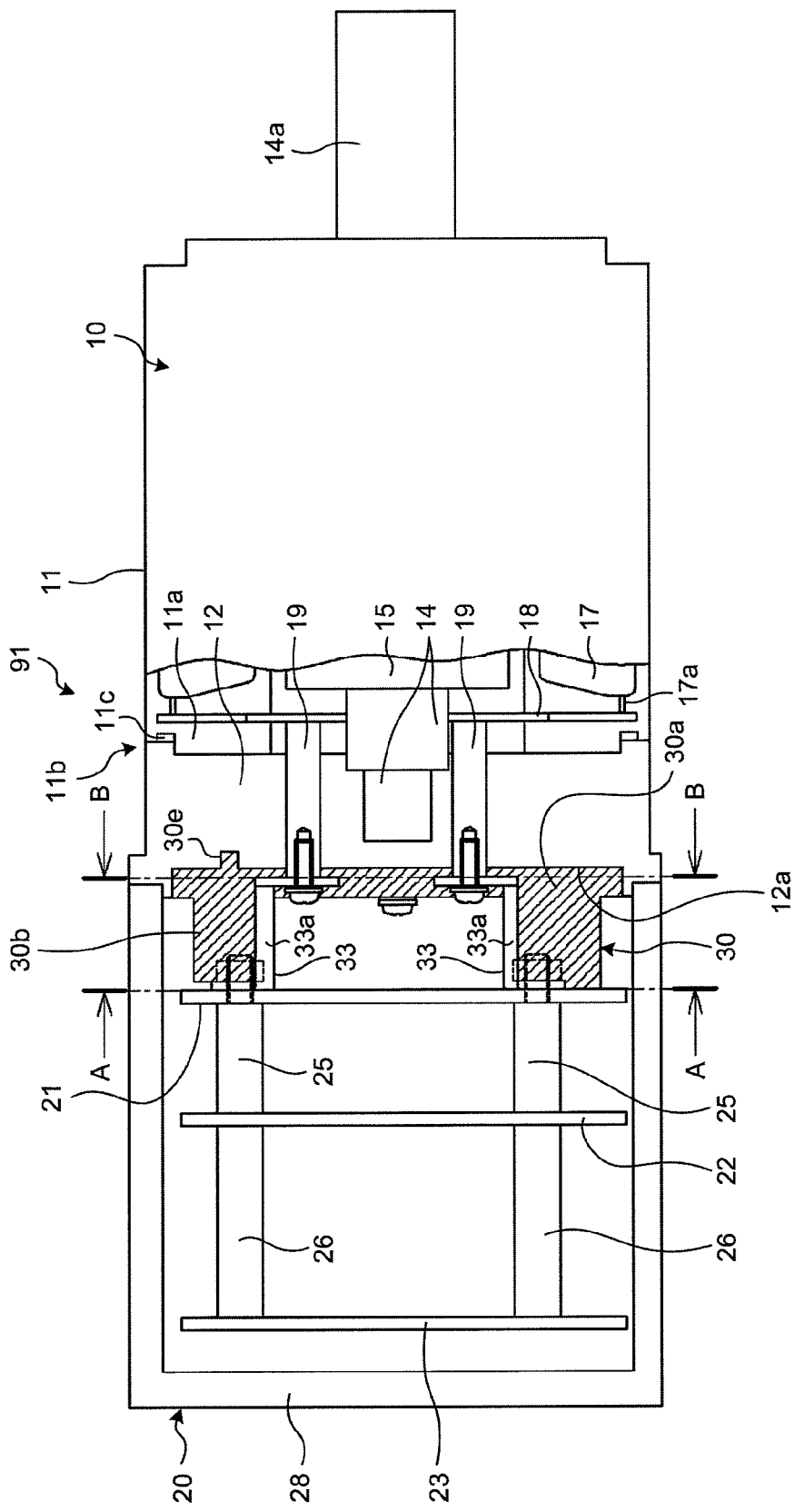
FIG. 1 is a longitudinal partial cross-sectional view showing a first embodiment of a motor according to the present invention.
Figure 2:
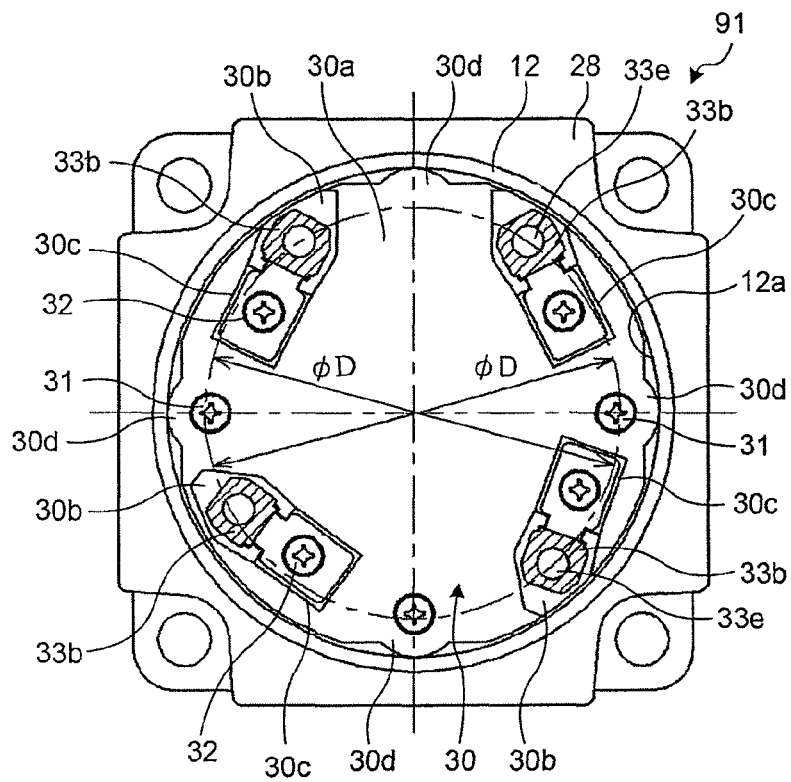
FIG. 2 is a transverse cross-sectional view taken along line A-A in FIG. 1.
Figure 3:
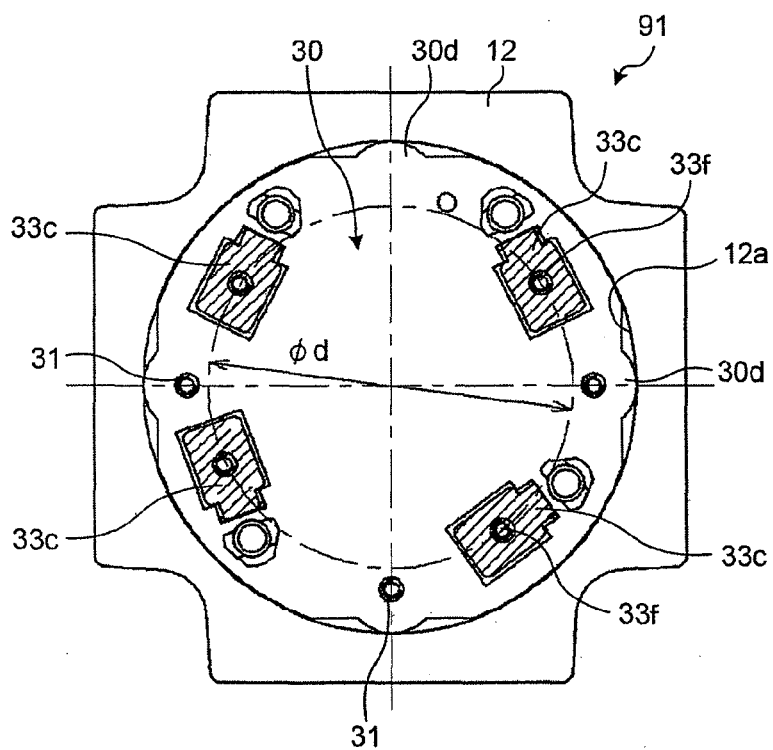
FIG. 3 is a transverse cross-sectional view taken along line B-B in FIG. 1.
Figure 4:
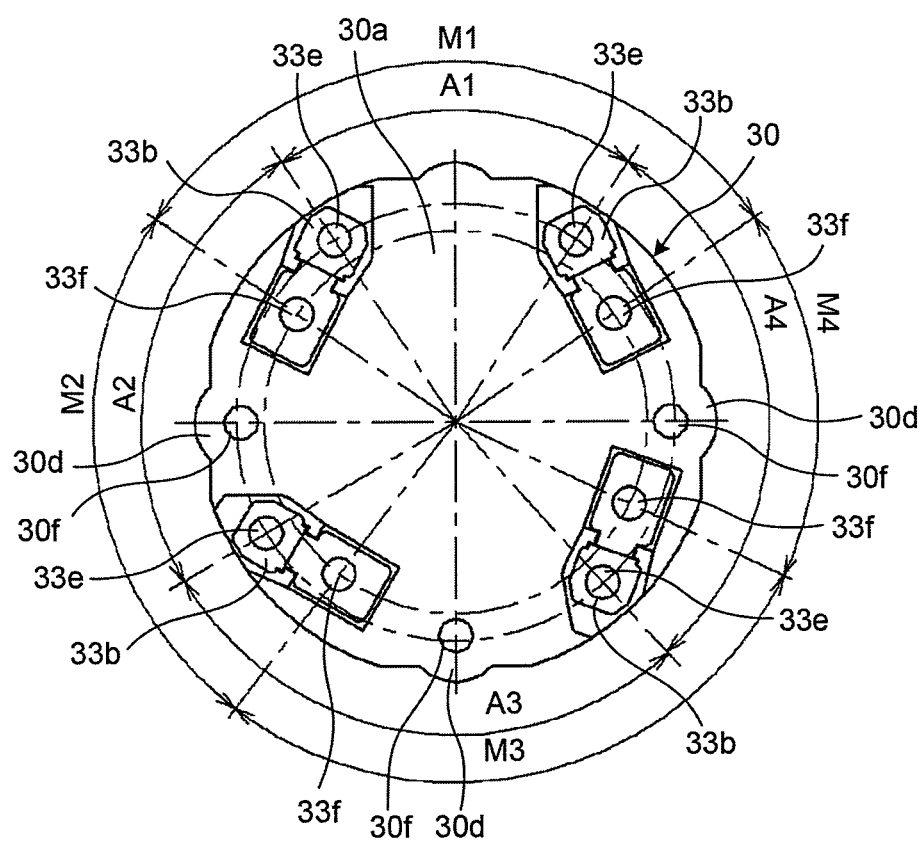
FIG. 4 is a front view showing a wire connection base in the first embodiment.
Figure 5:
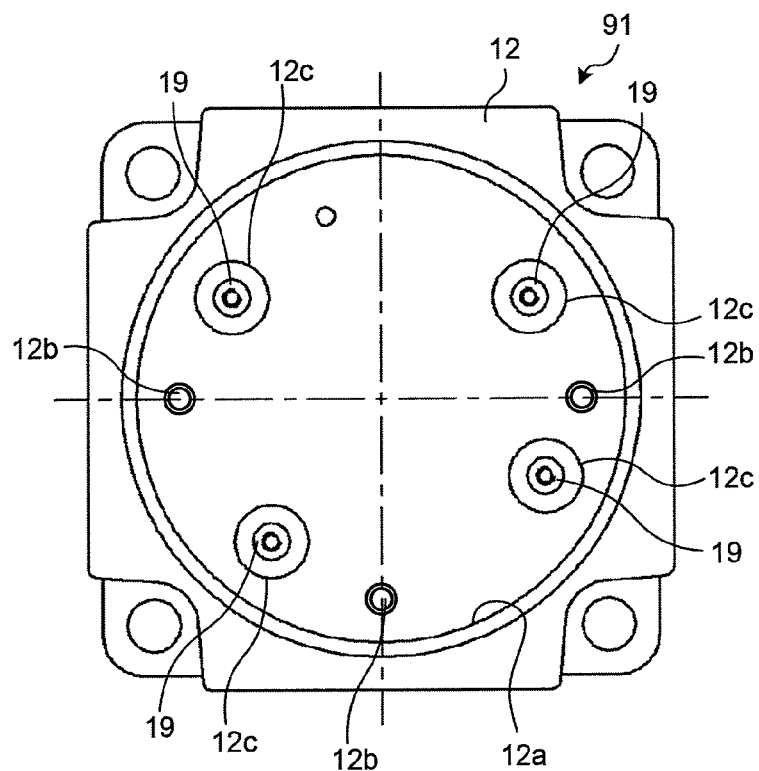
FIG. 5 is a front view showing a bracket fastened portion in the first embodiment.
Figure 6:
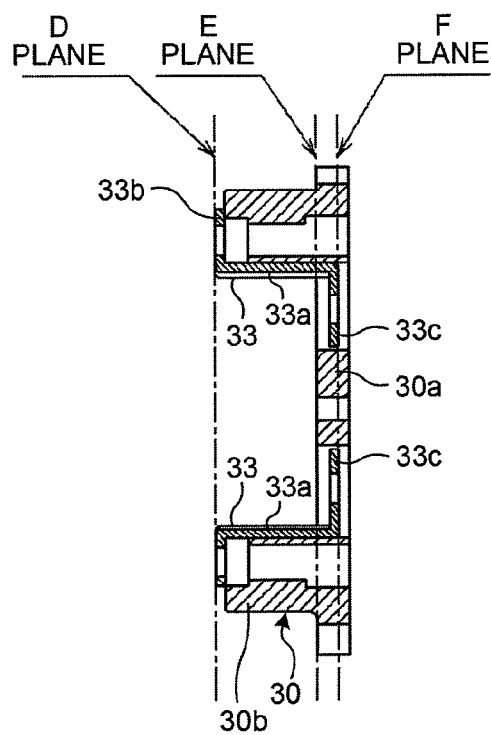
FIG. 6 is a longitudinal cross-sectional view of the wire connection base in the first embodiment.

FIG. 1 is a longitudinal partial cross-sectional view showing a first embodiment of a motor according to the present invention; FIG. 2 is a transverse cross-sectional view taken along line A-A in FIG. 1; FIG. 3 is a transverse cross-sectional view taken along line B-B in FIG. 1; FIG. 4 is a front view showing a wire connection base in the first embodiment; FIG. 5 is a front view showing a bracket fastened portion in the first embodiment; and FIG. 6 is a longitudinal cross-sectional view showing the wire connection base of the first embodiment.

As shown in FIGS. 1 to 3, a motor 91 of the first embodiment includes: a motor section 10; and an amplifier section 20 which is attached to an antiload side of the motor section 10, made integral with the motor section 10, and provides a driving power to the motor section 10. The motor section 10 and the amplifier section 20 are electrically and mechanically connected with each other by a wire connection base 30.

The motor section 10 includes: a motor case 11 having an antiload side bracket 12; a stator (not shown in the figure) fixed inside the motor case 11; coils 17 of respective phases which are wound around the stator; a rotating shaft 14 rotatably supported by the case 11; and a rotor 15 fixed to the rotating shaft 14 and placed inside the stator. An electric power is supplied from the amplifier section 20 to the coils 17 of the respective phases via the wire connection base 30, the rotor 15 is rotated to rotary-drive the rotating shaft 14, and a rotative power is outputted from a load side 14a of the rotating shaft 14.

A ring-shaped coil wiring substrate 18 is disposed on the antiload side of the coil 17 of each phase, and the coils 17 of the respective phases are connected to circuits of the coil wiring substrate 18, respectively, so as to be supplied with an electric power. A rod-shaped conductive motor-side spacer 19 for electrically connecting the coil wiring substrate 18 and the wire connection base 30 is disposed on the antiload side of the coil wiring substrate 18. A screw hole is provided at an end portion of the spacer 19. The spacers 19 are electrically connected to the wire connection base 30 through circular holes 12c (see FIG. 5) provided in the bracket 12.

The wire connection base 30 is made of a resin having an insulation property. The wire connection base 30 includes a disk portion 30a, and a plurality of (four in the first embodiment) base portions 30b each having a boat-shaped cross-section provided along a periphery of the disk portion 30a. The disk portion 30a adjacent to the base of the base portions 30b is provided with rectangular holes 30c.

The disk portion 30a of the wire connection base 30 is fitted into a circular recessed portion 12a provided in the bracket 12. A major part of a peripheral portion of the disk portion 30a is formed to be smaller than an inner diameter of the recessed portion 12a, and only convex portions 30d at four positions spaced apart from each other by 90° are formed with high accuracy so as to have an outer diameter equal to the inner diameter of the recessed portion 12a. In this way, an area of the portion to be processed with high accuracy is reduced, thereby achieving a cost reduction.

One or a plurality of projections 30e are provided on the back side of the disk portion 30a of the wire connection base 30. The projection 30e is fitted in the corresponding hole of the bracket 12 to prevent the wire connection base 30 from rotating in a circumferential direction thereof (to perform positioning).

As shown in FIG. 4, three screw through holes 30f spaced apart from each other by 90° are provided at the inner side of the three convex portions 30d in the disk portion 30a of the wire connection base 30. As shown in FIG. 5, three screw holes 12b corresponding to the three screw through holes 30f of the wire connection base 30 are provided inside the recessed portion 12a of the bracket 12. Three screws 31 (see FIG. 2) are passed through the screw through holes 30f and screwed into the screw holes 12b of the bracket 12, thereby mechanically connecting the wire connection base 30 to the bracket 12. Since only three screw through holes 30f and three screw holes 12b are respectively provided so as to be spaced apart from each other by 90°, the circumferential attachment position of the wire connection base 30 to the bracket 12 is uniquely determined. Thus, no attachment error occurs. Note that three or more screw through holes 30f and screw holes 12b may be provided and may be disposed at unequal angular intervals.

As shown in FIGS. 1 to 6, a plurality of (four) wire connection terminals 33 are installed in the wire connection base 30 by means of fitting. The wire connection terminal 33 includes: a body portion 33a positioned along one side surface of the base portion 30b of the wire connection base 30; an amplifier-side terminal 33b which is connected to one end of the body portion 33a, forms a right angle with the body portion 33a, and is placed along an end face of the base portion 30b; and a motor-side terminal 33c which is connected to the other end of the body portion 33a, forms a right angle with the body portion 33a, faces toward the opposite direction to the amplifier-side terminal 33b, and is inserted into the rectangular hole 30c of the wire connection base 30. Although the wire connection terminals 33 are installed in the wire connection base 30 by means of fitting in the first embodiment, the wire connection terminals 33 may be installed in the wire connection base 30 by means of insert molding The amplifier-side terminal 33b is provided with a screw hole 33e, and the motor-side terminal 33c is provided with a screw through hole 33f. The amplifier-side terminals 33b provided with the screw holes 33e form electrical and mechanical connection parts with the amplifier section 20. The motor-side terminals 33c provided with the screw through holes 33f form electrical connection parts with the motor section 10.

As shown in FIG. 2, a pitch diameter $\phi d$ for the screw through holes 33f of the motor-side terminals 33c (electrical connection parts with the motor section 10) is set to be smaller than a pitch diameter $\phi D$ for the screw holes 33e of the amplifier-side terminals 33b (electrical and mechanical connection parts with the amplifier section 20), and the electrical connection parts with the motor section 10 and the electrical and mechanical connection parts with the amplifier section 20 do not overlap with each other as viewed from the front thereof. Thus, when a screw 32 is screwed into the screw hole of the motor-side spacer 19 via the screw through hole 33f of the motor-side terminal 33c, the amplifier-side terminal 33b (electrical and mechanical connection part with the amplifier section 20) does not interfere with a driver inserted from the amplifier side, thereby facilitating the screw fastening operation.

Moreover, since the motor-side spacers 19 are disposed closer to the center of the motor 91, a resin mold frame 11a, a fitted portion 11b of the bracket 12, an O ring 11c, a coil wire connection 17a, and the like can be disposed in the motor section 10 by utilizing a space in the outer peripheral portion thereof. Moreover, in the amplifier section 20, electronic components can be disposed by utilizing a space in the center thereof, thereby achieving a reduction in dead space.

Moreover, as shown in FIG. 4, angular intervals A1 to A4 of the four screw holes 33e (electrical connection parts with the motor section 10) and angular intervals M1 to M4 of the four screw through holes 33*f* (electrical and mechanical connection parts with the amplifier section 20) are unequal intervals. With such a configuration, when the motor-side spacers 19 are connected to the motor-side terminals 33*c* and when the amplifier-side terminals 33*b* are connected to a first circuit substrate 21, connecting positions thereof are uniquely determined, thereby being able to prevent improper connection.

As shown in FIGS. 1 and 6, the motor-side terminals 33*c* as the electrical connection parts between the motor section 10 and the wire connection base 30 are disposed on the same plane (F plane: first plane). The amplifier-side terminals 33*b* as the electrical and mechanical connection parts between the amplifier section 20 and the wire connection base 30 are also disposed on the same plane (D plane: second plane). Therefore, axial lengths of a plurality of (four) wire connection terminals 33 (lengths of the body portions 33*a*) are identical to one another. Thus, the same components can be used for the plurality of wire connection terminals 33 to simplify the component configuration, thereby achieving a cost reduction.

Moreover, as shown in FIGS. 1, 2, and 6, bearing surfaces of the screws 31 for fastening the wire connection base 30 to the bracket 12 are on the same plane (E plane). Moreover, the F plane (the electrical connection parts between the motor section 10 and the wire connection base 30: the first plane), the D plane (the electrical and mechanical connection parts between the amplifier section 20 and the wire connection base 30: the second plane), the E plane, and a bracket 12 side end face of the wire connection base 30 (fixing surface with the motor section 10: a third plane) are parallel to one another. Thus, a bottom surface of the recessed portion 12*a* of the bracket 12 to which the wire connection base 30 is to be fixed can be processed with general-purpose lathe machining, thereby achieving a cost reduction. Furthermore, processing to obtain the flatness of the bottom surface of the recessed portion 12*a* can be performed with high accuracy, thereby improving the assembly accuracy in the respective connection parts. Moreover, in the amplifier section 20, the first, second, and third circuit substrates 21, 22, and 23 to be disposed in a layered form in a direction perpendicular to the rotating shaft 14 can be assembled so as to be parallel to one another.

Next, a method for assembling the motor 91 of the first embodiment will be described. First, the disk portion 30*a* of the wire connection base 30 is fitted into the recessed portion 12*a* of the bracket 12 in the motor section 10 for mounting. At this time, the projection 30*e* is fitted into the corresponding hole of the bracket 12 so as to perform the positioning of the wire connection base 30 in the circumferential direction thereof. Subsequently, the screws 31 are screwed into the screw holes 12*b* of the bracket 12 through the three screw through holes 30*f* of the wire connection base 30 so as to achieve a mechanical connection between the motor section 10 and the wire connection base 30.

Next, the screws 31 are screwed into the screw holes of the conductive motor-side spacers 19 in the motor section 10 for fastening via the screw through holes 33*f* of the plurality of (four) motor-side terminals 33*c* of the wire connection base 30 so as to achieve an electrical connection between the motor section 10 and the wire connection base 30. Subsequently, the first circuit substrate 21 on which electronic components of the amplifier section 20 are mounted is placed on the amplifier-side terminals 33*b* of the wire connection base 30, and male screws at one ends of conductive amplifier-side first spacers 25 are screwed into the screw holes 33*e* of the amplifier-side terminals 33*b* for fastening via four through holes of the first circuit substrate 21. That is, the first circuit substrate 21 is electrically and mechanically connected (screw-fastened) to the plurality of electrical and mechanical connection parts of the wire connection base 30 with the amplifier section 20 via the first spacers 25.

Next, the second circuit substrate 22 on which electronic components are mounted is placed on the other ends of the first spacers 25 so as to be layered on the first circuit substrate 21, and male screws at one ends of second spacers 26 are screwed into screw holes at the other ends of the first spacers 25 for fastening via four through holes of the second circuit substrate 22. As a result, the first circuit substrate 21 and the second circuit substrate 22 are electrically and mechanically connected to each other.

Subsequently, the third circuit substrate 23 on which electronic components are mounted is placed on the other ends of the second spacers 26 so as to be layered on the second circuit substrate 22, and screws (not shown in the figure) are screwed into screw holes at the other ends of the second spacers 26 for fastening via four through holes of the third circuit substrate 23. As a result, the second circuit substrate 22 and the third circuit substrate 23 are electrically and mechanically connected to each other. As described above, the wire connection base 30 electrically connects the motor section 10 with the amplifier section 20, and retains the amplifier section 20 on the motor section 10.

Next, the connected wire connection base 30 and the layered first, second, and third circuit substrates 21, 22, and 23 are covered with an amplifier case 28, and the amplifier case 28 is fastened to the antiload-side bracket 12. Thus, the assembly of the motor 91 is completed.

As described above, in the motor 91 of the first embodiment, the motor section 10 is made integral with the amplifier section 20 simply by screwing. Moreover, the pitch diameter $\phi d$ for the electrical connection parts between the wire connection base 30 and the motor section 10 is set to be smaller than the pitch diameter $\phi D$ for the electrical and mechanical connection parts between the wire connection base 30 and the amplifier section 20, and therefore they do not overlap with each other as viewed from the front thereof. Therefore, when the electrical connection parts between the wire connection base 30 and the motor section 10 are screw-fastened, the electrical and mechanical connection parts between the wire connection base 30 and the amplifier section 20 do not interfere with a driver inserted from the amplifier side, thereby facilitating the screw fastening operation.

Moreover, the plurality of circuit substrates 21, 22, and 23 in the amplifier section 20 are disposed in a layered form, and the circuit substrates 21, 22, and 23 are connected with each other with the conductive spacers 25 and 26 by means of screwing only. Thus, it is possible to avoid heat stress as compared to a conventional technique with which the amplifier section 20 is resin-encapsulated at a relatively high temperature. Moreover, by increasing the height of the wire connection base 30, it is possible to suppress heat interference between the motor section 10 and the amplifier section 20. Moreover, when the amplifier section 20 has a failure, disassembly thereof and component replacement are possible, thereby having an excellent maintenance performance.

Second Embodiment

Figure 7:
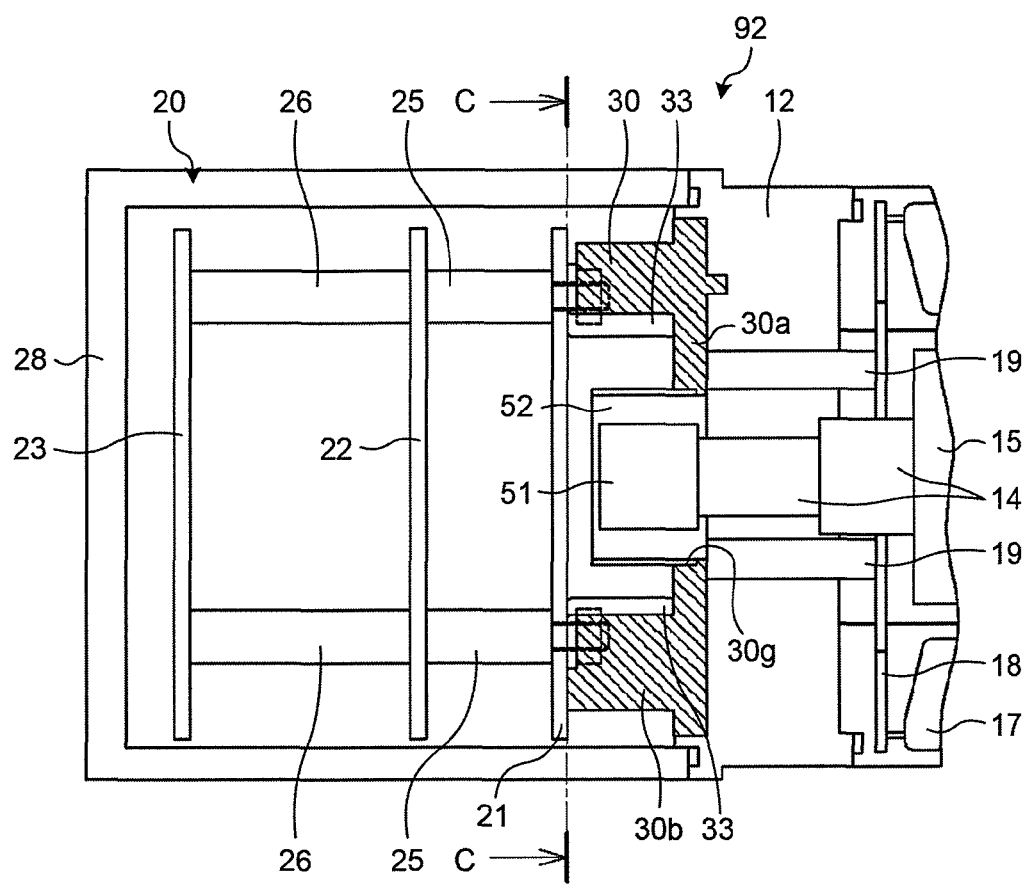
FIG. 7 is a partial longitudinal cross-sectional view showing a second embodiment of a motor according to the present invention.
Figure 8:
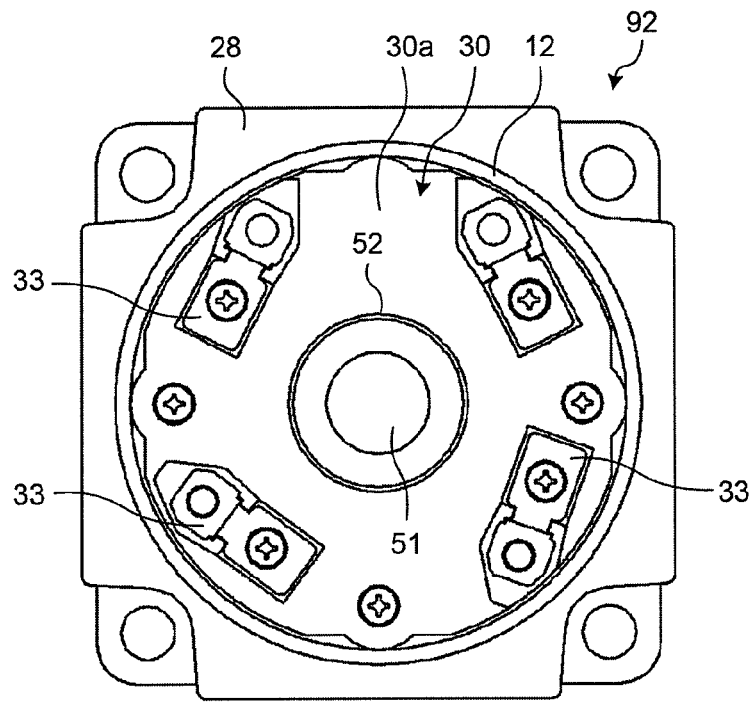
FIG. 8 is a transverse cross-sectional view taken along line C-C in FIG. 7.

FIG. 7 is a partial longitudinal cross-sectional view showing a second embodiment of a motor according to the present invention. FIG. 8 is a transverse cross-sectional view taken along line C-C in FIG. 7. As shown in FIGS. 7 and 8, a motor 92 of the second embodiment includes a large-diameter hole 30*g* formed at a central portion of the disk portion 30*a* of the wire connection base 30, and a tubular shield 52 made of a magnetic material is attached to the large-diameter hole 30g. Inside the tubular shield 52, there is disposed a sensor 51, such as a rotary encoder, which is attached to the antiload-side end portion of the rotating shaft 14. The motor 92 of the second embodiment is not different from the motor 91 of the first embodiment except for the above-described points. According to the motor 92 of the second embodiment, it is possible to shield an external magnetic influence on the sensor 51.

Third Embodiment

Figure 9:
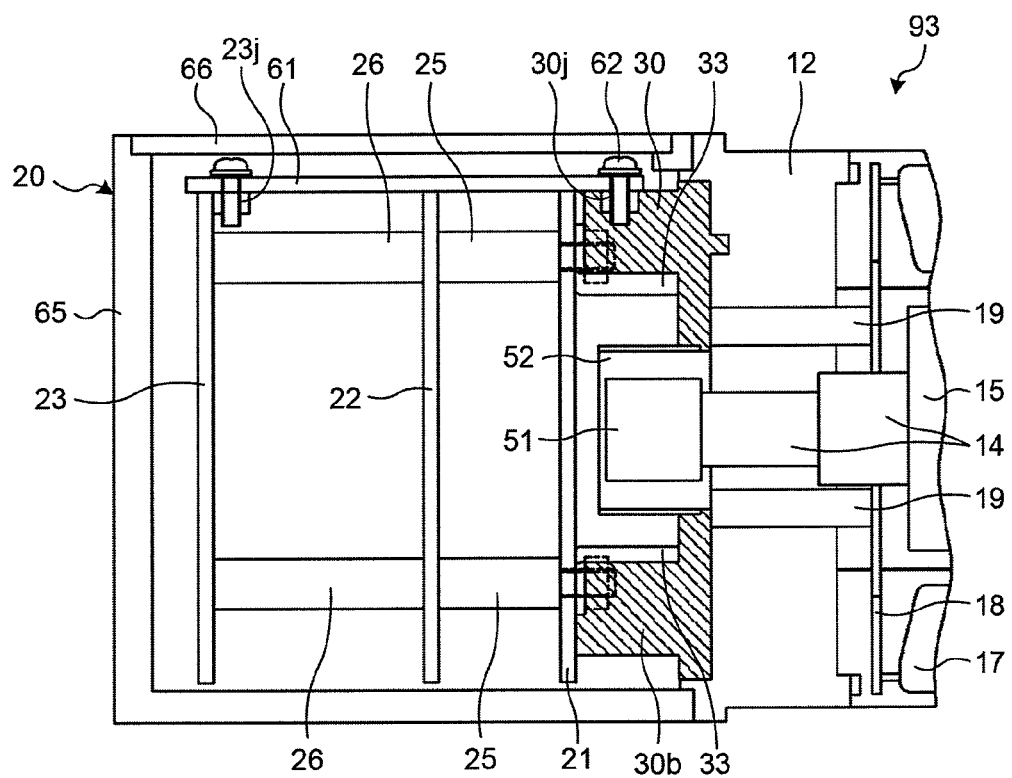
FIG. 9 is a partial longitudinal cross-sectional view showing a third embodiment of a motor according to the present invention.

FIG. 9 is a partial longitudinal cross-sectional view showing a third embodiment of a motor according to the present invention. As shown in FIG. 9, a motor 93 of the third embodiment includes a fourth circuit substrate 61 having electronic components mounted thereon, which is disposed so as to be parallel to the rotating shaft 14 at the side portion of the first, second, and third circuit substrates 21, 22, and 23. The fourth circuit substrate 61 is fastened to the a fastening portion 30j provided at a side portion of the wire connection base 30 and a fastening portion 23j provided at a side portion of the third circuit substrate 23 by screws 62. The wire connection base 30 and the first, second, third, and fourth circuit substrates 21, 22, 23, and 61 are covered with an amplifier case 65. The amplifier case 65 includes a removable lid 66 on the side of the fourth circuit substrate 61, and maintenance and inspection of the fourth circuit substrate 61 can be performed with the lid 66 being removed. The motor 93 of the third embodiment is not different from the motor 92 of the second embodiment except for the above-described points.

REFERENCE SIGNS LIST 10 motor section
11 motor case
11a resin mold frame
11b fitted portion
11c O ring
12 bracket
12a recessed portion
12b screw hole
12c circular hole
14 rotating shaft
14a load side
15 rotor
17 coil
17a coil wire connection
18 coil wiring substrate
19 spacer
20 amplifier section
21 first circuit substrate
22 second circuit substrate
23 third circuit substrate
23j fastening portion
25 first spacer
26 second spacer
28 amplifier case
30 wire connection base
30a disk portion
30b base portion
30c rectangular hole
30d convex portion
30e projection
30f screw through hole
30g large-diameter hole
30j fastening portion
31, 32 screw
33 wire connection terminal
33a body portion
33b amplifier-side terminal
33c motor-side terminal
33e screw hole
33f screw through hole
51 sensor
52 tubular shield
61 fourth circuit substrate
62 screw
65 amplifier case
66 lid
91, 92, 93 motor

The invention claimed is:

1. A motor comprising:
a motor section including a stator around which a coil is wound, and a rotor disposed within the stator for rotary-driving a rotating shaft;
an amplifier section made integral with the motor section for supplying a driving power to the motor section;
a wire connection base which comprises a first side and a second side opposing the first side and is configured to connect the motor section and the amplifier section electrically and mechanically with each other, on the first side and the second side, respectively; and
a screw which is inserted, from the first side of the wire connection base into the motor section, to mechanically connect the wire connection base to the motor section,
wherein a pitch diameter for a plurality of electrical connection parts disposed on the first side of the wire connection base and connecting the wire connection base with the motor section disposed on a circumference, whose center is at a shaft center of the rotating shaft, is set to be smaller than a pitch diameter for a plurality of electrical and mechanical connection parts disposed on the second side of the wire connection base and connecting the wire connection base with the amplifier section,
the amplifier section includes a plurality of circuit substrates disposed in a layered form in a direction perpendicular to the rotating shaft, and
the plurality of circuit substrates are electrically and mechanically screw-fastened to the plurality of electrical and mechanical connection parts of the wire connection base with the amplifier section via a conductive spacer.

2. The motor according to claim 1, wherein angular intervals for the plurality of electrical and mechanical connection parts of the wire connection base with the motor section disposed on the circumference whose center is at the shaft center of the rotating shaft, and/or angular intervals for the plurality of electrical and mechanical connection parts with the amplifier section are unequal intervals.

3. The motor according to claim 1, wherein the plurality of electrical and mechanical connection parts of the wire connection base with the motor section disposed on the circumference whose center is at the shaft center of the rotating shaft are disposed on a first plane, and
the plurality of electrical and mechanical connection parts with the amplifier section are disposed on a second plane.

4. The motor according to claim 3, wherein a fixing surface of the wire connection base to the motor section forms a third plane, and
the first plane on which the plurality of electrical and mechanical connection parts of the wire connection base with the motor section disposed on the circumference whose center is at the shaft center of the rotating shaft are disposed and the second plane on which the plurality of electrical and mechanical connection parts with the amplifier section are disposed are parallel to the third plane.

5. The motor according to claim 1, wherein the wire connection base includes a plurality of fastening portions to be fastened to the motor section, and
   the plurality of fastening portions are disposed at unequal intervals.

6. The motor according to claim 1, wherein a large-diameter hole is formed at a central portion of a disk portion of the wire connection base, and
   a tubular shield made of a magnetic material is attached to the large-diameter hole.

7. The motor according to claim 1, wherein another circuit substrate is disposed at a side portion of the plurality of circuit substrates so as to be parallel to the rotating shaft.

* * * * *